(12) United States Patent
Yao et al.

(10) Patent No.: US 9,141,802 B2
(45) Date of Patent: Sep. 22, 2015

(54) COMPUTING DEVICE BOOT SOFTWARE AUTHENTICATION

(71) Applicant: Intel Corporation, Santa Clara, CA (US)

(72) Inventors: Jiewen Yao, Shanghai (CN); Vincent J. Zimmer, Federal Way, WA (US)

(73) Assignee: INTEL CORPORATION, Santa Clara, CA (US)

( * ) Notice: Subject to any disclaimer, the term of this patent is extended or adjusted under 35 U.S.C. 154(b) by 430 days.

(21) Appl. No.: 13/626,772

(22) Filed: Sep. 25, 2012

(65) Prior Publication Data

US 2014/0089651 A1   Mar. 27, 2014

(51) Int. Cl.
| | |
|---|---|
| G06F 9/24 | (2006.01) |
| G06F 9/00 | (2006.01) |
| G06F 15/177 | (2006.01) |
| H04L 29/06 | (2006.01) |
| H04L 9/32 | (2006.01) |
| G06F 12/14 | (2006.01) |
| G06F 7/04 | (2006.01) |
| G06F 17/30 | (2006.01) |
| G06F 21/57 | (2013.01) |
| H04L 9/30 | (2006.01) |
| G06F 9/44 | (2006.01) |
| G06F 21/60 | (2013.01) |
| G06F 21/51 | (2013.01) |
| G06F 21/64 | (2013.01) |
| G06F 21/44 | (2013.01) |

(52) U.S. Cl.
CPC ............ *G06F 21/572* (2013.01); *G06F 21/575* (2013.01); *H04L 9/30* (2013.01); *H04L 9/3247* (2013.01); *G06F 9/24* (2013.01); *G06F 9/4401* (2013.01); *G06F 9/4416* (2013.01); *G06F 21/44* (2013.01); *G06F 21/51* (2013.01); *G06F 21/60* (2013.01); *G06F 21/64* (2013.01)

(58) Field of Classification Search
None
See application file for complete search history.

(56) References Cited

U.S. PATENT DOCUMENTS

| 6,158,000 A * | 12/2000 | Collins | 713/1 |
| 6,173,398 B1 * | 1/2001 | Kim | 713/2 |
| 2003/0014622 A1 * | 1/2003 | Larvoire | 713/2 |
| 2003/0084342 A1 * | 5/2003 | Girard | 713/201 |

(Continued)

OTHER PUBLICATIONS

Rosenbaum et al., "A Tour Beyond BIOS into UEFI Secure Boot", Intel Corporation, 47 pgs., Jul. 2012.

(Continued)

*Primary Examiner* — Ji H Bae
(74) *Attorney, Agent, or Firm* — Kacvinsky Daisak Bluni PLLC

(57) ABSTRACT

Various embodiments are generally directed to authenticating a chain of components of boot software of a computing device. An apparatus comprises a processor circuit and storage storing an initial boot software component comprising instructions operative on the processor circuit to select a first set of boot software components of multiple sets of boot software components, each set of boot software components defines a pathway that branches from the initial boot software component and that rejoins at a latter boot software component; authenticate a first boot software component of the first set of boot software components; and execute a sequence of instructions of the first boot software component to authenticate a second boot software component of the first set of boot software components to form a chain of authentication through a first pathway defined by the first set of boot software components. Other embodiments are described and claimed herein.

27 Claims, 10 Drawing Sheets

(56) References Cited

U.S. PATENT DOCUMENTS

| | | | |
|---|---|---|---|
| 2003/0221114 A1* | 11/2003 | Hino et al. | 713/189 |
| 2006/0129795 A1* | 6/2006 | Bulusu et al. | 713/2 |
| 2007/0192611 A1* | 8/2007 | Datta et al. | 713/176 |
| 2011/0113225 A1* | 5/2011 | Lu et al. | 713/1 |

OTHER PUBLICATIONS

Nystrom et al., "UEFI Networking and Pre-OS Security", Intel Technology Journal, vol. 15, Issue 1, 22 pgs., (2011).

Zimmer et al., "Intel Technology Journal UEFI Today: Bootstrapping the Continuum", Intel Technology Journal, vol. 15, Issue 1, pp. 1-25 (2001).

Zimmer et al., "Intel Technology Journal UEFI Today: Bootstrapping the Continuum", Intel Technology Journal, vol. 15, Issue 1, pp. 26-50 (2001).

Zimmer et al., "Intel Technology Journal UEFI Today: Bootstrapping the Continuum", Intel Technology Journal, vol. 15, Issue 1, pp. 51-70 (2001).

Zimmer et al., "Intel Technology Journal UEFI Today: Bootstrapping the Continuum", Intel Technology Journal, vol. 15, Issue 1, pp. 71-90 (2001).

Zimmer et al., "Intel Technology Journal UEFI Today: Bootstrapping the Continuum", Intel Technology Journal, vol. 15, Issue 1, pp. 91-110 (2001).

Zimmer et al., "Intel Technology Journal UEFI Today: Bootstrapping the Continuum", Intel Technology Journal, vol. 15, Issue 1, pp. 111-130 (2001).

Zimmer et al., "Trusted Platforms UEFI, PI and TCG-based firmware", White Paper by Intel Corporation and IBM Corporation, pp. 1-12, Sep. 2009.

Zimmer et al., "Trusted Platforms UEFI, PI and TCG-based firmware", White Paper by Intel Corporation and IBM Corporation, pp. 13-20, Sep. 2009.

Zimmer et al., "Trusted Platforms UEFI, PI and TCG-based firmware", White Paper by Intel Corporation and IBM Corporation, pp. 21-28, Sep. 2009.

Zimmer et al., "Trusted Platforms UEFI, PI and TCG-based firmware", White Paper by Intel Corporation and IBM Corporation, pp. 29-39, Sep. 2009.

Zimmer et al., "Trusted Platforms UEFI, PI and TCG-based firmware", White Paper by Intel Corporation and IBM Corporation, pp. 40-50, Sep. 2009.

Zimmer et al., "Trusted Platforms UEFI, PI and TCG-based firmware", White Paper by Intel Corporation and IBM Corporation, Sep. 2009, 50 pages.

* cited by examiner

COMPUTING DEVICE BOOT SOFTWARE AUTHENTICATION

BACKGROUND

Greater sophistication and variety in the types of components currently incorporated into computing devices, along with a need for a greater range of features incorporated into their boot software, have resulted in a new trend of boot software made up of multiple distinct parts provided by different sources. Unfortunately, this new trend creates new opportunities for the security of computing devices to be compromised through the surreptitious inclusion of malicious software intended to enable invasions of privacy, fraud, theft of information, etc. (commonly called "malware").

As an example of an increasing variety in types of components, there is an increasing variety of types of storage device employing an increasing variety of interfaces by which a storage device may be coupled to a computing device to enable data to be stored thereon and retrieved therefrom. Each new variety or type of device to be added as a component to a computing device requires software support to enable its use by the computing device.

This new trend has also been spurred by the increasing desire to provide a greater range of functionality in the boot software independent of whatever functionality may later be provided by an operating system that is loaded after operation of the boot software, and to which control is normally transferred to complete the boot process. An example of such new functionality is the ability to format, perform diagnostics on, and/or defragment the contents of various storage devices, as well as to load, copy, transfer and/or delete content stored thereon.

Prior implementations of boot software have usually comprised a single fully compiled piece of software commonly known as BIOS (basic input/output system) that is of relatively small size and often does little more than initialize hardware components to a known state before transferring control to an operating system, as well as providing a limited software interface to access a relatively modest set of basic functions. This single-piece configuration of BIOS has inherently forestalled efforts to introduce malware. Unfortunately, the desire to use a multiple-part form of boot software introduces the potential for malware to be surreptitiously included as one of those multiple parts. It is with respect to these and other considerations that the techniques described herein are needed.

DETAILED DESCRIPTION

Figure 1:
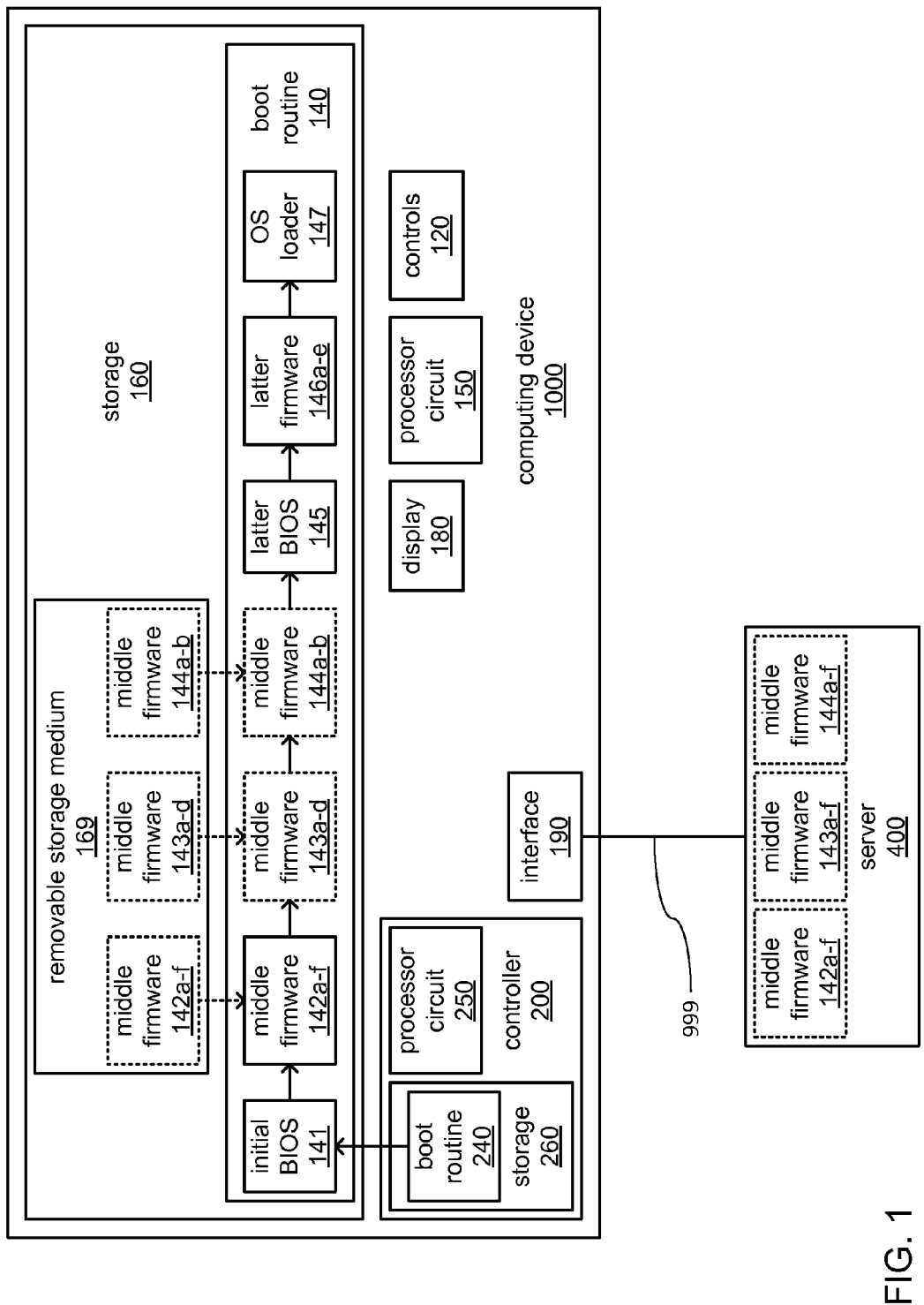
FIG. 1 illustrates a first embodiment of booting a computing device.

Various embodiments are generally directed to authenticating a chain of components of boot software of a computing device. Some embodiments are particularly directed to authentication of a selected one of multiple alternate chains of boot software components defining alternate parallel pathways of a boot process that may be chosen leading to a later common boot software component at which the parallel pathways rejoin.

More specifically, during a boot process by which components of boot software are executed to initialize hardware components of a computing device to a known state and to provide a software interface to a limited set of functions in preparation to execute other software (e.g., an operating system loader and/or an operating system), a chain of authentication of boot software components is formed. In that chain of authentication, each component of the boot software authenticates another component of the boot software.

The chain of authentication begins at a known and trusted point in the boot process. Hardware components of a computing device may provide and/or ensure the trustworthiness of the known and trusted starting point, including a controller comprising a boot software component that is substantially isolated in the controller's processing environment from the main processing environment of a computing device in which subsequent boot software components in the chain of authentication are executed. With such isolation between the controller's processing environment and the main processing environment, tampering of the boot software component in the controller's processing environment at the start of the chain of authentication by malware executed in the main processing environment is prevented and/or made substantially more difficult.

Due to a need to accommodate the use of alternate boot software components, the chain of authentication is able to follow any selected one of multiple parallel pathways that branch from a common boot software component at one point in the boot process, and rejoin at another boot software component at a later point in the boot process, with each of the parallel pathways comprising at least one boot software component of its own. As will be explained in greater detail, signatures that are made with private keys and embedded within boot software components are checked by others of the boot software components using public keys. Through the use of a series of signatures and public keys, the formation of a chain of authentication is enabled, including the branching and rejoinder of multiple parallel pathways.

In one embodiment, for example, an apparatus comprises a processor circuit, and a storage communicatively coupled to the processor circuit and arranged to store an initial boot software component comprising a sequence of instructions operative on the processor circuit to select a first set of boot software components of multiple sets of boot software components, each set of boot software components defines a pathway that branches from the initial boot software component and that rejoins at a latter boot software component; authenticate a first boot software component of the first set of boot software components; and execute a sequence of instructions of the first boot software component to authenticate a second boot software component of the first set of boot software components to form a chain of authentication through a first pathway defined by the first set of boot software components. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 optionally coupled to a server 400. Each of the computing devices 400 and 1000 may be any of a variety of types of computing device, including without limitation, a desktop computer system, a data entry terminal, a laptop computer, a netbook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc. As depicted, the computing devices 400 and 1000 exchange signals conveying one or more boot software components via a network 999 that the computing device 1000 may employ in its own boot sequence. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 comprises one or more of a storage 160 storing a boot routine 140, a processor circuit 150, controls 120, a display 180, a controller 200, and an interface 190 coupling the computing device 1000 to the network 999. The boot routine 140 comprises one or more of an initial BIOS 141 (basic input/output system); middle firmware 142$a$-$f$, 143$a$-$d$ and/or 144$a$-$b$; a latter BIOS 145; a latter firmware 146$a$-$e$ and an OS loader 147. The storage 160 may, at various times, further comprise a removable storage medium 169 storing one or more copies and/or variants of the middle firmware 142$a$-$f$, 143$a$-$d$ and/or 144$a$-$b$ for use by the computing device 1000 as alternate boot software components in its own boot sequence. The controller 200 comprises one or more of a storage 260 storing a boot routine 240, and a processor circuit 250. The boot routine 240; the initial BIOS 141; the middle firmware 142$a$-$f$, 143$a$-$d$ and/or 144$a$-$b$; the latter BIOS 145; the latter firmware 146$a$-$e$ and the OS loader 147 are examples of boot software components of which the boot software of the computing device 1000 (e.g., the boot routines 240 and 140) are variously composed.

The controller 200, with the processor circuit 250 and at least the boot routine 240, defines an operating environment of the controller 200 that is intentionally isolated from the main operating environment defined within much of the rest of the computing device 1000 that is defined by the processor circuit 150 and at least the boot routine 140. More specifically, the processor circuit 150 is provided with limited or no access to the storage 260 and/or other components of the controller 200, thereby preventing unauthorized access to at least the boot routine 240 (either as stored in the storage 260 or as executed by the processor circuit 250) by the processor 150 under the control of what may be malicious software attempting to alter or subvert at least the boot routine 240 by attempting to access the storage 260. However, in contrast, the processor circuit 250 may have considerably greater access to hardware and/or software components of the rest of the computing device 1000 beyond the controller 200 (e.g., the storage 160, the interface 190, etc.). As will be explained in greater detail, this enables the operating environment of the controller 200 to be employed as a trusted starting point for a chain of authentication of boot software components employed in performing a boot process of the computing device 1000.

The computing device 1000 performs a boot process at least in response to electric power being provided to the computing device 1000 (e.g., "powering on" the computing device 1000), if not also in response to a reset operation triggered by software and/or hardware of the computing device 1000 (e.g., a "reset" button or combination of keyboard keys triggering a reset having been pressed, possibly including keys of the controls 120). FIG. 1 depicts a progression of authentication among boot software components resulting in a chain of authentication among them. Regardless of what triggers the boot process, it is intended that the boot process always starts with a boot software component that is deemed to be trustworthy such that it can be deemed to have not been altered, replaced or otherwise subverted such that instructions of software intended to break security, invade privacy, steal personal or other information, enable fraud, etc. are not made part of the boot process. It is envisioned that the chain of authentication extends from the start of a boot process in an unbroken manner to at least the point of booting an operating system, where whatever mechanisms may be provided by the operating system for securing its own components are then relied upon to continue to maintain security.

Where the computing device 1000 is booting (in other words, performing a boot process) in response to the provision of electric power thereto, the processor circuit 250 executes instructions of the boot routine 240, causing the processor circuit 250 to initialize hardware components of at least the controller 200, and possibly hardware components of the computing device 1000 beyond the controller 200. The processor circuit 250 also accesses the storage 160 to authenticate the initial BIOS 141 of the boot routine 140 as being an authorized version of the initial BIOS 141 such that it may be deemed a trusted boot software component. Presuming that the initial BIOS 141 is determined to be authentic, the processor circuit 250 is caused to transfer control to the initial BIOS 141 which is executed by the processor 150. The processor 150 is caused to perform further initialization tasks, maybe including initializing hardware components of the computing system 1000 beyond the controller 200 to known states. As will be explained in greater detail, the processor 150 also accesses at least one of the software components of the middle firmware 142a-x, 143a-x and/or 144a-x, taking one of multiple possible parallel pathways and authenticating one or more of them serially, as links in a chain of authentication from one of these boot software components to the next. Presuming that all of the boot software components making up the selected one of parallel pathways through the middle firmware have been authenticated, the processor 150 then accesses the latter BIOS 145 to authenticate it. Presuming that the latter BIOS 145 is authenticated, the processor 150 then accesses the latter firmware 146a-e to authenticate it. Presuming the latter firmware 146a-e is authenticated, the processor accesses the OS loader 147 to authenticate it. As each of the above-described authentications are performed, thereby forming a chain of authentication, control is generally transferred along that chain of authentication from the boot routine 240 to the OS loader 147 by which an operating system is caused to be loaded and executed.

Where the computing device 1000 is booting in response to a reset operation (e.g., receipt of a signal to reset the computing device 1000), an assumption may be made that the initial BIOS 141 may be relied upon as a trusted starting point on the basis that the initial BIOS 141 was previously authenticated by the processor circuit 250 under the control of the boot routine 240 when the computing device 1000 was powered on. From the initial BIOS 141, onward, this boot process may then be substantially identical to what was just described as occurring in response to the provision of electric power. Alternatively, authentication during a boot process in response to a reset operation may be treated no different from authentication during a boot process in response to the provision of power, with the boot routine 240 executed by the processor circuit 250 as the trusted starting point in the chain of authentication.

In various embodiments, each of the processor circuits 150 and 250 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160 and 260 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). It should yet further be noted that at least a portion of one or more of these storages may be remotely located, possibly implemented as a network-attached storage (NAS) device accessible via a network connection employing a specialized storage protocol such as ISCSI.

In various embodiments, the interface 190 may employ any of a wide variety of signaling technologies enabling the computing device 1000 to be coupled through the network 999 as has been described. Each of these interfaces comprises circuitry providing at least some of the requisite functionality to enable such coupling. However, each of these interfaces may also be at least partially implemented with sequences of instructions executed by the processor circuits 150 and/or 250 (e.g., to implement a protocol stack or other features). Where one or more portions of the network 999 employs electrically and/or optically conductive cabling, the interface 190 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, the interface 190 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface 190 is depicted as a single block, one or more of these may comprise multiple interfaces that may be based on differing signaling technologies. This may be the case especially where one or more of these interfaces couples the computing device 1000 to more than one network, each employing differing communications technologies.

In various embodiments, the controls 120 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. The controls 120 may comprise manually-operable controls disposed upon a casing of the computing device 1000, and/or may comprise manually-operable controls disposed on a separate casing of a physically separate component of the computing device 1000 (e.g., a remote control coupled to other components via infrared signaling). Alternatively or additionally, the controls 120 may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, the display 180 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 2:
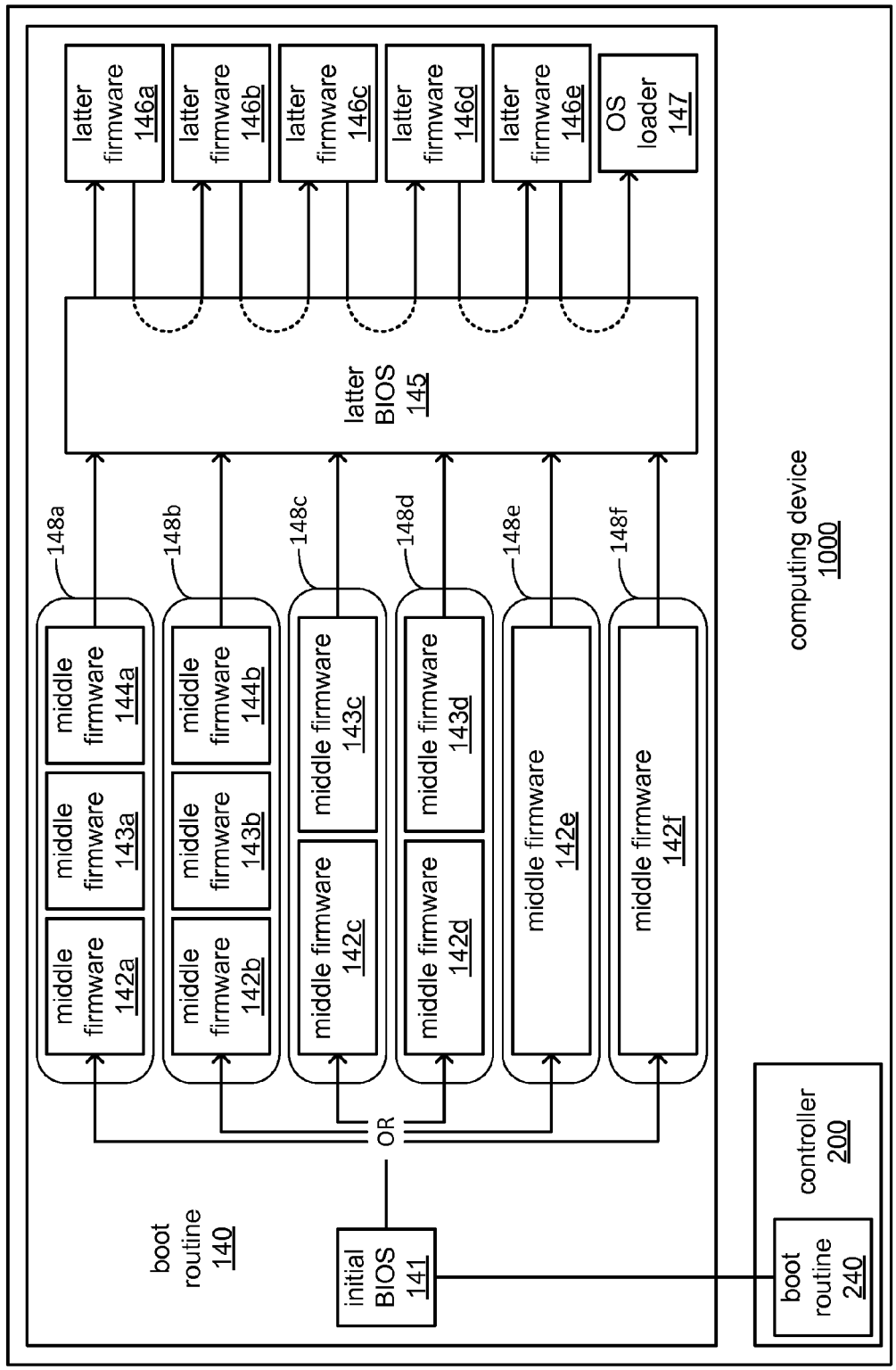
FIG. 2 illustrates a portion of the embodiment of FIG. 1.

FIG. 2 depicts a portion of the computing device 1000 in greater detail, including aspects of the selection and use of one of multiple available parallel pathways 148a-f comprising differing sets of middle firmware through which a chain of authentication may be formed. As those skilled in the art of boot software design will readily recognize, much of the function served by boot software is initializing hardware components of a computing device to a known state in support of subsequently booting an operating system, and providing a mechanism by which basic features of hardware components may be configured via a minimal form of user interface. Given that the processor circuit, memory circuits, support logic, interface logic, etc. of the majority of computing devices typically do not change over time, there is typically little reason to alter or replace many of the components of the boot software.

However, the earlier-described developing trend of adding various utilities, support for various new user input/output devices, etc. to boot software has led to a desire to make it possible to subdivide boot software into separate portions to allow alteration or replacement of only a portion of the boot software (e.g., alteration or replacement of less than all of the boot software components) as part of granting the flexibility to add such functions. It has become clear that the initial components responsible for initialization of the most basic hardware components and the latter components responsible for enabling manual configuration and for assembling final data structures needed to support booting an operating system are considerably less likely to require alteration or replacement to accommodate the addition of such functions than the components between those initial and latter components, e.g., the middle firmware 142a-f, 143a-d and/or 144a-b.

To accommodate this greater likelihood of needing replace boot software components making up the middle firmware to add such new functionality while continuing to maintain security, an authentication scheme is employed in which different sets of middle firmware between the initial BIOS 141 and the latter BIOS 145 may be swapped. A system of signatures embedded into boot software components and matched to public keys also embedded into boot software components, thereby enabling boot software components to authenticate other boot software components may be employed to both enable the initial BIOS 141 to authenticate any of the middle firmware 142a-f, and to enable any one of the middle firmware 144a-b, 143c-d, or 142e-f to authenticate the latter BIOS 145. In this way, an unbroken chain of authentication is able to be formed that extends from at least the initial BIOS 141 (or possibly from the boot routine 240), all the way through whatever middle firmware is selected, and to the OS loader 147.

Thus, FIG. 2 depicts up to six possible sets of middle firmware that may be selected for use in a boot process of the computing system 1000, depending on the functionality that is desired to be provided as part of that boot process. And, as also depicted, each of those six selectable sets of middle firmware defines a different one of the pathways 148a-f through which the chain of authentication may extend from the initial BIOS 141 to the latter BIOS 145 as part of extending between the boot routine 240 and the OS loader 147. More precisely, and as depicted, the pathway 148a includes the middle firmware 142a, 143a and 144a; the pathway 148b includes the middle firmware 142b, 143b and 144b; the pathway 148c includes the middle firmware 142c and 143c; the pathway 148d includes the middle firmware 142d and 143d; the pathway 148e includes only the middle firmware 142e; and the pathway 148f includes only the middle firmware 142f. It should be noted that this specific depiction of six sets of middle firmware components defining six pathways, and this specific depiction of particular quantities of middle firmware components within each of these depicted six pathways is to provide but a single example of choices among parallel pathways. It is entirely possible to have more or fewer selections in such pathways in a given embodiment, and/or to have greater or fewer middle firmware components in each of those pathways.

Various techniques may be employed to select which of the depicted pathways 148a-f are selected in a given performance of a boot procedure by the computing device 1000. It may be that a one of the pathways 148a-f is selected by loading the middle firmware components defining it into a particular memory address location of a portion of the storage 160. Alternatively or additionally, an address pointer to a particular memory address location at which those middle firmware components are located may be provided to a register of the processor circuit 150 and/or to another hardware component of the computing device 1000.

Further, various embodiments may employ a prioritization of one or more of the pathways 148a-f, thereby defining an order in which authentication of different ones of the pathways 148a-f is attempted until a one of the pathways 148a-f through which an unbroken chain of authentication may be formed is found. Thus, where authentication is attempted of the middle firmware components defining a first pathway, but fails, authentication is then attempted of the middle firmware components defining a second pathway, and so on, until a pathway having middle firmware components able to be authenticated all the way through to the latter BIOS 145 is found. It should be noted that failure of authentication may not necessarily indicate that a middle firmware component has been deliberately corrupted or deliberately replaced with improper software. It may be that a once perfectly legitimate middle firmware component or the private key used to sign it is for some reason no longer deemed appropriate to use such that it signature or the private key used to digitally sign it has been revoked, possibly by adding that signature or a corresponding public key to a blacklist. Alternatively, it may be that a memory error in a component of the storage 160 has occurred that has corrupted a middle firmware component such that it can no longer be authenticated.

It should be noted that despite the side-by-side depiction of all six of the pathways 148a-f in FIG. 2, it should not be assumed that all of the middle firmware components of all six of these pathways are actually stored in the storage 160 at the same time in every instance or in every embodiment. The middle firmware components defining one or more of these pathways may be stored on a removable medium (e.g., the removable storage medium 169) and/or within a storage of a server accessible via the interface 190 and the network 999 (e.g., a storage of the server 400). Indeed, it may be that only the middle firmware components defining just one of the pathways 148a-f are stored within a more permanent portion of the storage 160 at any one time, and that middle firmware components defining one or more of the others of the pathways 148a-f may be stored in the removable storage medium 169 and/or by the server 400. And, it may be that this is part of a mechanism by which a normally used boot process of the computing device 1000 based on middle firmware more permanently stored within the storage 160 and associated with one of the pathways 148a-f is able to be temporarily changed through the temporary use of middle firmware stored in the server 400 or the removable storage medium 169 and associated with one of the others of the pathways 148a-f. Indeed, a prioritization of possible pathways may be employed to initially search for and attempt to authenticate the middle firmware components of an alternate pathway that is stored on the removable storage medium 169 if the removable storage medium 169 is detected as present during a boot process of the computing device 1000.

Regardless of how one of the pathways 148a-f and its associated middle firmware components are selected, and presuming that authentication is successful to the extent of forming an unbroken chain of authentication from the boot routine 240 (or at least the initial BIOS 141) to the latter BIOS 145, the processor circuit 150 is then caused by execution of the latter BIOS 145 to authenticate each one of the latter firmware 146a-e, before authenticating the OS loader 147 in preparation for booting an operating system. Unlike the middle firmware 142a-f, 143a-d and 144a-b, none of the latter firmware 146a-e comprises a public key, a whitelist or a blacklist by which any of the latter firmware 146a-e may authenticate another boot software component.

Figure 3:
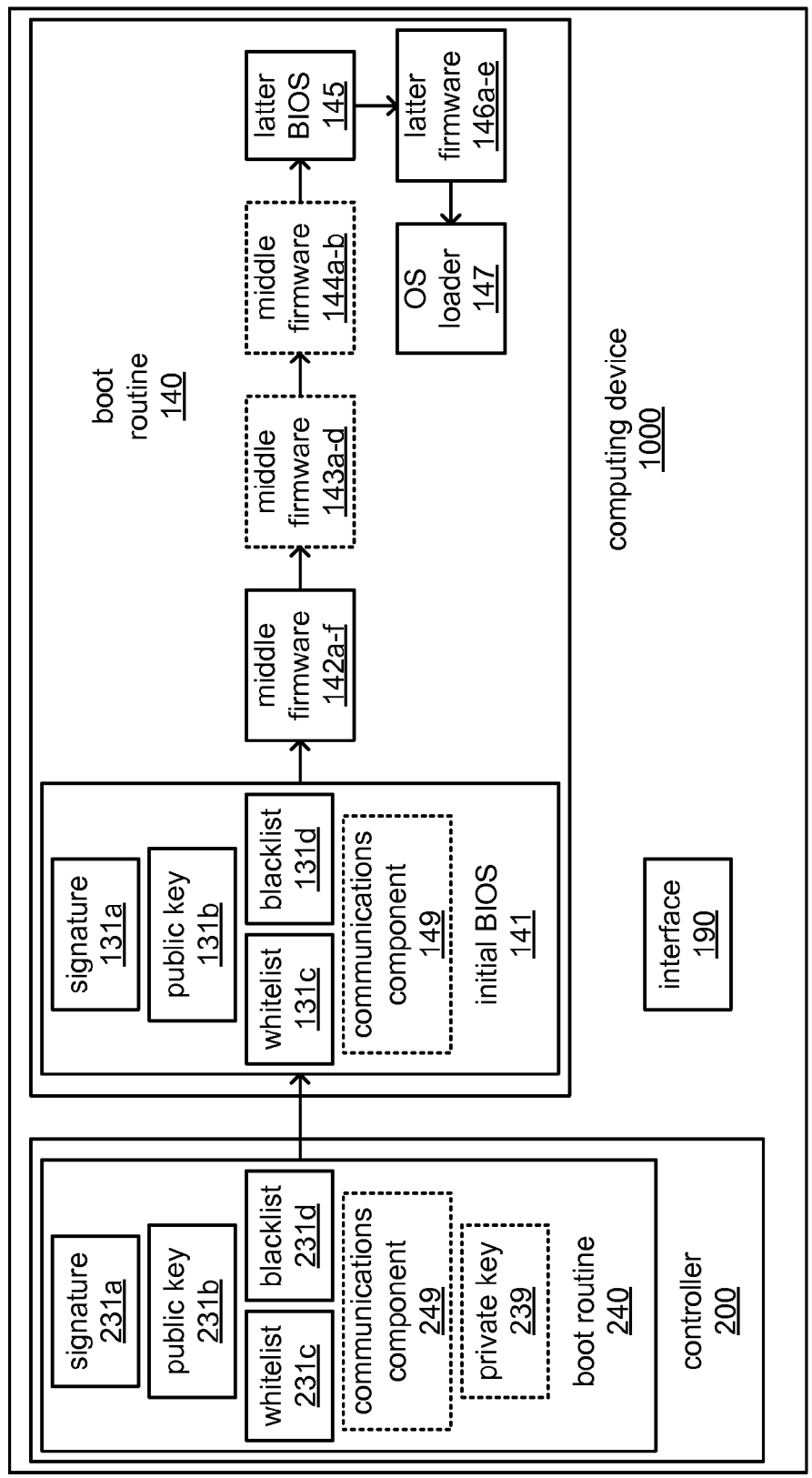
FIG. 3 illustrates a portion of the embodiment of FIG. 1.

FIG. 3 depicts a portion of the computing device 1000 in greater detail, including aspects of one possible approach to authenticating the initial BIOS 141 by the processor circuit 250 as a result of its execution of the boot routine 240. A combination of a signature associated with the initial BIOS 141 and a public key maintained by the controller 200 (possibly augmented with a whitelist and/or a blacklist) is employed in carrying out this authentication, representing a first step in a chain of authentication extending from the trusted starting point of the boot routine 240.

In various embodiments, the boot routine 240 is comprised of one or more of a signature 231a, a public key 231b, a whitelist 231c, a blacklist 231d, a communications component 249, and possibly also a private key 239. If the signature 231a is included, it may be that the boot routine 240 is digitally signed with a private key maintained externally to the computing device 1000 as part of making the boot routine 240, itself, amenable to being authenticated, possibly by an entirely separate computing device as part of a procedure to ensure that only an authenticated variant of the boot routine 240 is loaded into the storage 260 at the time of manufacture of the computing device 1000. If the private key 239 is included, it may be that the boot routine 240 is provided a private key to enable it to digitally sign one or more boot software components that may subsequently be included in a chain of authentication and executed by the processor circuit 150 under selected conditions where those one or more boot software components were not previously digitally signed. Although it is generally deemed to be best practice to not allow a private key to be widely distributed beyond the entity that issues public keys (e.g., a certification authority), the isolated nature of the storage 260 may be deemed to provide sufficient security to allow storage of the private key 239 therein. The private key 239 may be encrypted and/or other measures may be taken to prevent its being compromised. The public key 231b, the whitelist 231c, and/or the blacklist 231d are embedded in the boot routine 240 (one or more of these possibly in an encrypted manner), enabling their use by the processor circuit 250 under the control of the boot routine 240 to authenticate the initial BIOS 141.

In various embodiments, the initial BIOS 141 is comprised of one or more of a signature 131a, a public key 131b, a whitelist 131c, a blacklist 131d and a communications component 149. The initial BIOS 141 (or a portion or a derivative thereof) is digitally signed with a private key (not stored within the computing device 1000) to enable the initial BIOS 141 to be authenticated by the boot routine 240 using a matching public key, as will soon be explained. The public key 131b, the whitelist 131c, and/or the blacklist 131d are embedded in the initial BIOS 141 (possibly in an encrypted manner), enabling their use by the processor circuit 150 under the control of the initial BIOS 141 to authenticate a middle firmware component (e.g., one of the middle firmware 142a-f).

In causing the processor circuit 250 to authenticate the initial BIOS 141, the boot routine 240 may cause the processor circuit 250 to first read the initial BIOS 141 to retrieve the signature 131a embedded therein and to then employ a public key to authenticate the initial BIOS 141 by verifying that the signature 131a was formed using a private key that is a match to that public key. As will be familiar to those skilled in the art, various approaches to generating the signature 131a embedded within the initial BIOS 141 are possible. In one variation, the signature 131a is created simply by digitally signing the whole of the initial BIOS 141 with a private key. In another variation, only a selected portion of the initial BIOS 141 is digitally signed to create the signature 131a. In still another variation, some or all of the initial BIOS 141 is hashed to form a "digest" (sometimes also referred to as a "message digest" where the portion of the initial BIOS 141 that is hashed is referred to as a "message"), and then that digest is digitally signed to create the signature 131a that is then embedded in the initial BIOS 141.

In some embodiments, the boot routine 240 attempts to verify the signature 131a of the initial BIOS 141 by iteratively trying one public key at a time from a multitude of public keys stored as part of the whitelist 231c until a matching public key is found or until all of the public keys therein have been tried without success. In such embodiments, the initial BIOS 141 is deemed authenticated if its signature 131a can be verified to have been made using a private key that is a match to any of the public keys stored as part of the whitelist 231c. However, in such embodiments, the whitelist 231c may be supplemented with the blacklist 231d in which is stored one or more public keys that match private keys that have been revoked. As those skilled in the art will readily recognize, blacklisting a public key is a possible mechanism of effecting the revocation of a matching private key that may have been compromised in some way (e.g., leaked such that it is no longer secret). Thus, where the blacklist 231d is also present and used by the boot routine 240, the initial BIOS 141 can only be authenticated if its signature 131a is able to be verified as having been made using a private key that matches one of the public keys of the whitelist 231c, but which does not match a public key of the blacklist 231d.

In other embodiments, the boot routine 240 attempts to verify the signature 131a of the initial BIOS 141 by determining whether the signature 131a was created with a private key that is a match for the public key 231b. Thus, in such embodiments, only one public key is tried. However, in such embodiments, this single public key 231b may be supplemented with the blacklist 231d in which is stored indications of signatures that are not to be accepted despite being created with a private key that is determined to match the public key 231b. These indications of signatures not to be accepted may comprise hashes or digests of portions of (or all of) various versions of the initial BIOS 141, or may comprise copies of the signatures themselves. Thus, where the blacklist 231d is also present and used by the boot routine 240, the initial BIOS 141 can only be authenticated if its signature 131a is able to be verified as having been made using a private key that matches the public key 231b, and where that signature is not indicated in the blacklist 231d as being a signature that is not to be accepted. Alternatively or additionally, this single public key 231b may be supplemented with the whitelist 231c in which is stored indications of signatures that are to be accepted as long as they are determined to have been created with a private key that matches the public key 231b. Again, these indications may comprise hashes or digests of portions of (or all of) various versions of the initial BIOS 141, or may comprise copies of the signatures themselves. Thus, where the whitelist 231c is also present and used by the boot routine 240, the initial BIOS 141 can only be authenticated if its signature 131a is able to be verified as having been made using a private key that matches the public key 231b, and where that signature is indicated in the whitelist 231c as being a signature that is to be accepted. In still other variations, both the whitelist 231c and the blacklist 231d may be present and so employed such that all three of these conditions must be met for successful authentication of the initial BIOS 141.

As has been discussed, it may be that one or more desired boot software components are not available within any component of the storage 160, but are available via the network 999 from a server (e.g., the server 400). In support of retrieving such externally-stored boot software components, the boot routine 240 may comprise the communications component 249 and/or the initial BIOS 141 may comprise the communications component 149 to enable operation of the interface 190 to do so.

Figure 4:
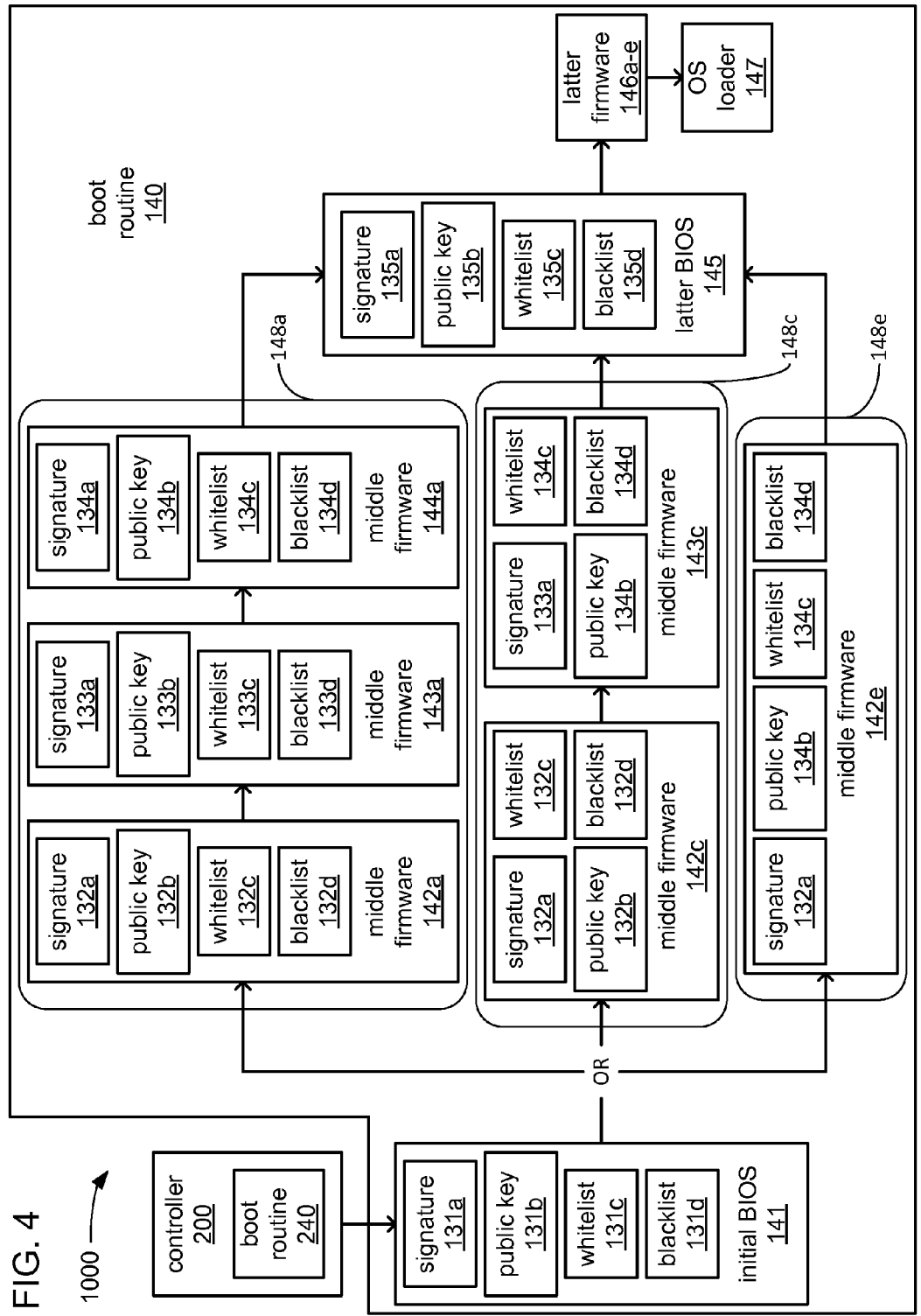
FIG. 4 illustrates a portion of the embodiment of FIG. 1.

FIG. 4 depicts a portion of the computing device 1000 in greater detail, including aspects of an approach to authenticating middle firmware components in one of the pathways 148a, 148c or 148e (for sake of clarity of depiction and discussion, only these three pathways are specifically shown and discussed). Again, combination(s) signatures and public keys, possibly augmented with whitelist(s) and/or blacklist(s) are employed in carrying out this authentication.

In various embodiments, the latter BIOS 145 is comprised of one or more of a signature 135a, a public key 135b, a whitelist 135c, and a blacklist 135d. The latter BIOS 145 is digitally signed with a private key (maintained externally from the computing device 1000), thereby forming the signature 135a to enable the latter BIOS 145 to authenticated by a middle firmware component, as will soon be explained. The public key 135b, the whitelist 135c, and/or the blacklist 135d are embedded in the latter BIOS 145 (possibly in an encrypted manner), enabling their use by the processor circuit 150 under the control of the latter BIOS 145 to authenticate one or more of the latter firmware 146a-e.

Turning to the pathway 148a, the middle firmware 142a is comprised of one or more of a signature 132a, a public key 132b, a whitelist 132c and a blacklist 132d; the middle firmware 143a is comprised of one or more of a signature 133a, a public key 133b, a whitelist 133c and a blacklist 133d; and the middle firmware 144a is comprised of one or more of a signature 134a, a public key 134b, a whitelist 134c and a black list 134d. Turning to the pathway 148c, the middle firmware 142c is comprised of one or more of a signature 132a, a public key 132b, a whitelist 132c and a blacklist 132d; and the middle firmware 143c is comprised of one or more of a signature 133a, a public key 134b, a whitelist 134c and a black list 134d. Turning to the pathway 148e, the middle firmware 142e (the only boot software component associated with the pathway 148e) is comprised of one or more of a signature 132a, a public key 134b, a whitelist 134c and a black list 134d.

It should be noted that, as depicted, all three of the middle firmware 142a, 142c and 142e comprise the signature 132a. It may be that the each of these three middle firmware components have the very same signature 132a embedded therein, or that each of these firmware components is provided with a different version of the signature 132a embedded therein.

It should also be noted that, as depicted, all three of the middle firmware 144a, 143c and 142e comprise the very same public key 134b, whitelist 134c and/or blacklist 134d. This is in recognition of the fact that regardless of which these three sets of middle firmware components (each of which defines a different one of the pathways 148a, 148c and 148e) is selected to be included in the a boot process of the computing device 1000, each of these three middle firmware components must be able to authenticate the very same latter BIOS 145.

Continuing from the discussion related to FIG. 3, following successful authentication of the initial BIOS 141, the processor 150 is then caused by its execution of instructions of the initial BIOS 141 to authenticate the middle firmware components of whichever one of the depicted pathways 148a, 148c or 148e has been selected to be included in this booting of the computing device 1000.

Where the middle firmware 142a, 143a and 144a defining the pathway 148a are so selected, the processor circuit 150 is caused by the initial BIOS 141 to read the middle firmware 142a to retrieve its signature 132a and to determine if it was created with a private key that is a match to a public key embedded within the initial BIOS 141 (either the public key 131b, if present, or a public key among a multitude of public keys stored as the whitelist 131c, if present). The processor circuit 150 may further be caused to compare the retrieved signature 132a to indications of accepted signatures in the whitelist 131c and/or to signatures that are not accepted in the blacklist 131d. Presuming that the middle firmware 142a is successfully authenticated, the processor 150 is caused by execution of instructions of the middle firmware 142a to read the middle firmware 143a to retrieve its signature 133a, and to perform one or more similar tests using the public key 132b, the whitelist 132c and/or the blacklist 132d of the middle firmware 142a. Presuming that the middle firmware 143a is successfully authenticated, the processor 150 is caused by execution of instructions of the middle firmware 143a to read the middle firmware 144a to retrieve its signature 134a, and to perform one or more similar tests using the public key 133b, the whitelist 133c and/or the blacklist 133d of the middle firmware 143a. Presuming that the middle firmware 144a is successfully authenticated, the processor 150 is caused by execution of instructions of the middle firmware 144a to read the latter BIOS 145 to retrieve its signature 135a, and to perform one or more similar tests using the public key 134b, the whitelist 134c and/or the blacklist 134d of the middle firmware 144a.

Where the middle firmware 142c and 143c defining the pathway 148c are so selected, the processor circuit 150 is caused by the initial BIOS 141 to read the middle firmware 142c to retrieve its signature 132a and to determine if it was created with a private key that is a match to a public key embedded within the initial BIOS 141 (either the public key 131b, if present, or a public key among a multitude of public keys stored as the whitelist 131c, if present). The processor circuit 150 may further be caused to compare the retrieved signature 132a to indications of accepted signatures in the whitelist 131c and/or to signatures that are not accepted in the blacklist 131d. Presuming that the middle firmware 142c is successfully authenticated, the processor 150 is caused by execution of instructions of the middle firmware 142c to read the middle firmware 143c to retrieve its signature 133a, and to perform one or more similar tests using the public key 132b, the whitelist 132c and/or the blacklist 132d of the middle firmware 142c. Presuming that the middle firmware 143c is successfully authenticated, the processor 150 is caused by execution of instructions of the middle firmware 143c to read the latter BIOS 145 to retrieve its signature 135a, and to perform one or more similar tests using the public key 134b, the whitelist 134c and/or the blacklist 134d of the middle firmware 143c.

Where the middle firmware 142e defining the pathway 148e is so selected, the processor circuit 150 is caused by the initial BIOS 141 to read the middle firmware 142e to retrieve its signature 132a and to determine if it was created with a private key that is a match to a public key embedded within the initial BIOS 141 (either the public key 131b, if present, or a public key among a multitude of public keys stored as the whitelist 131c, if present). The processor circuit 150 may further be caused to compare the retrieved signature 132a to indications of accepted signatures in the whitelist 131c and/or to signatures that are not accepted in the blacklist 131d. Presuming that the middle firmware 142e is successfully authenticated, the processor 150 is caused by execution of instructions of the middle firmware 142e to read the latter BIOS 145 to retrieve its private key 135a, and to perform one or more similar tests using the public key 134b, the whitelist 134c and/or the blacklist 134d of the middle firmware 142e.

Thus, as depicted in FIG. 4, an unbroken chain of authentication may be formed through any of the three depicted pathways 148a, 148c or 148e.

Figure 5:
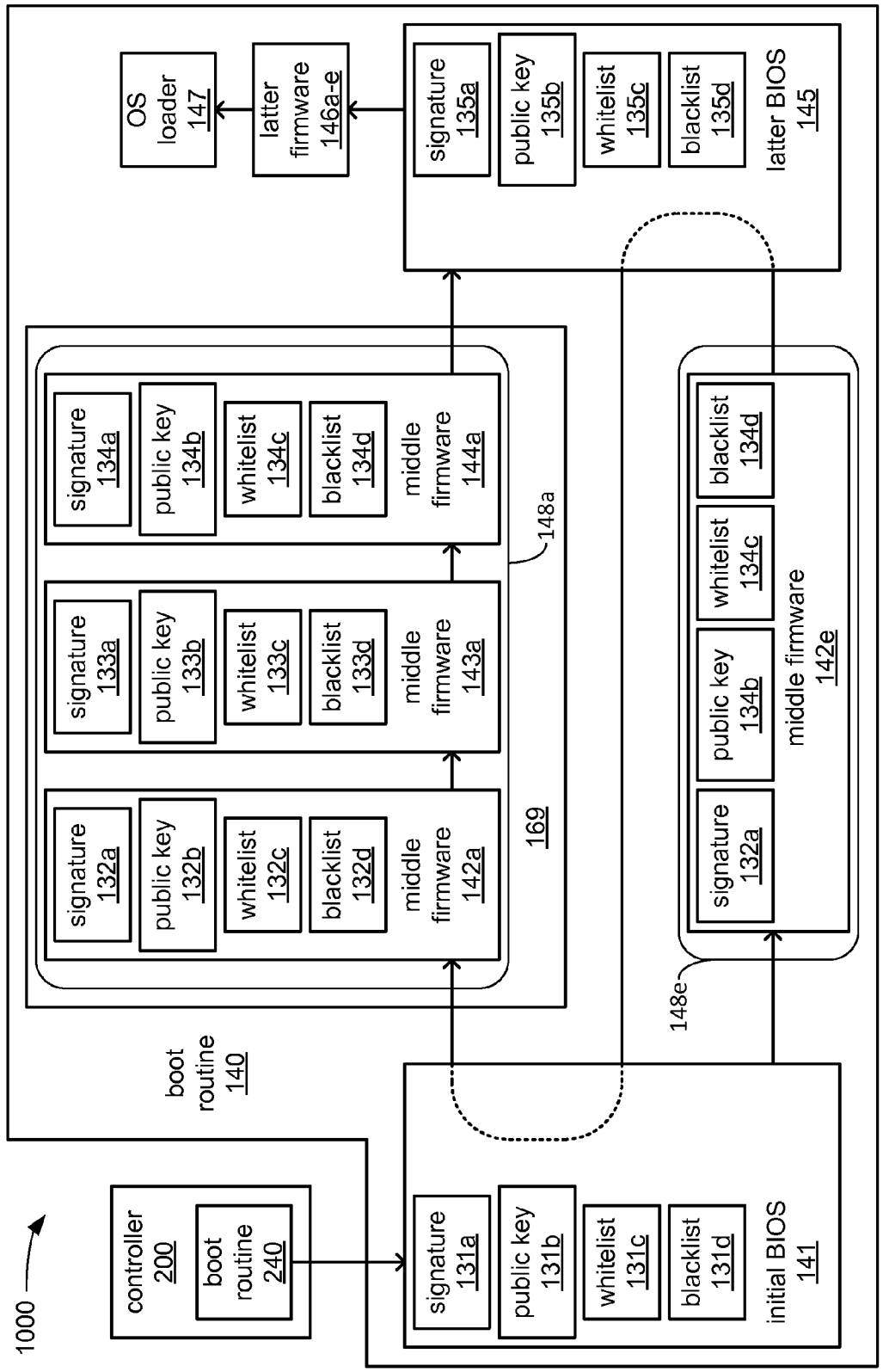
FIG. 5 illustrates a first example using the embodiment of FIG. 1.

FIG. 5 depicts an example of use of features of the computing device 1000 in which a first boot process is followed by a second boot process in response to receipt of a signal conveying a command to use the second boot process. Specifically, as depicted in FIG. 5, the computing device 1000 is initially booted in a first boot process in which a chain of authentication was successfully formed from the boot routine 240 to the latter BIOS 145 through the pathway 148e defined by the middle firmware 142e.

With the successful authentication of the latter BIOS 145, the processor circuit 150 is caused to execute instructions of the various boot software components along that chain of authentication up to the latter BIOS 145, and in so doing, would normally proceed with authenticating each of the latter firmware 146a-e and the OS loader 147 in preparation for subsequently booting an operating system associated with the OS loader 147. However, at some point during the boot process, either leading up to execution of the latter BIOS 145 or during execution of the latter BIOS 145, a prompt may have been presented (possibly visually presented on the display 180) setting forth an opportunity for the boot process to be halted and a setup utility to be run in response to operation of the controls 120 (e.g., a typical prompt on a personal computer to press a "delete" key of a keyboard to halt booting and enter a setup utility).

In response to the receipt of a signal indicating the controls 120 being so operated (or in response to the receipt of a signal originating in some other manner), at least a portion of the authentication of boot software components beyond the latter BIOS 145 is caused to not occur, and instead, a user interface of a setup utility is presented (possibly visually presented on the display 180) that provides an opportunity to command that the second boot process occur using the pathway 148a defined by the middle firmware 142a, 143a and 144a, instead of the pathway 142e. In response to another signal indicting the controls 120 being so operated (or in response to another signal originating in some other manner) to signal the computing device 1000 with such a command, and as depicted in FIG. 5, the second boot process is performed using the initial BIOS 141 as the trusted starting point of a new chain of authentication formed through the pathway 148a.

It may be that the middle firmware 142e was of relatively limited functionality compared to the greater functionality provided by the combination of the middle firmware 142a, 143a and 144a. Such greater functionality may comprise support for further and/or larger character sets than are included in any industry-standard version of ASCII character set, or may comprise one or more diagnostics tools to support external monitoring of the functionality of the computing device 1000 for debug or other purposes.

Figure 6:
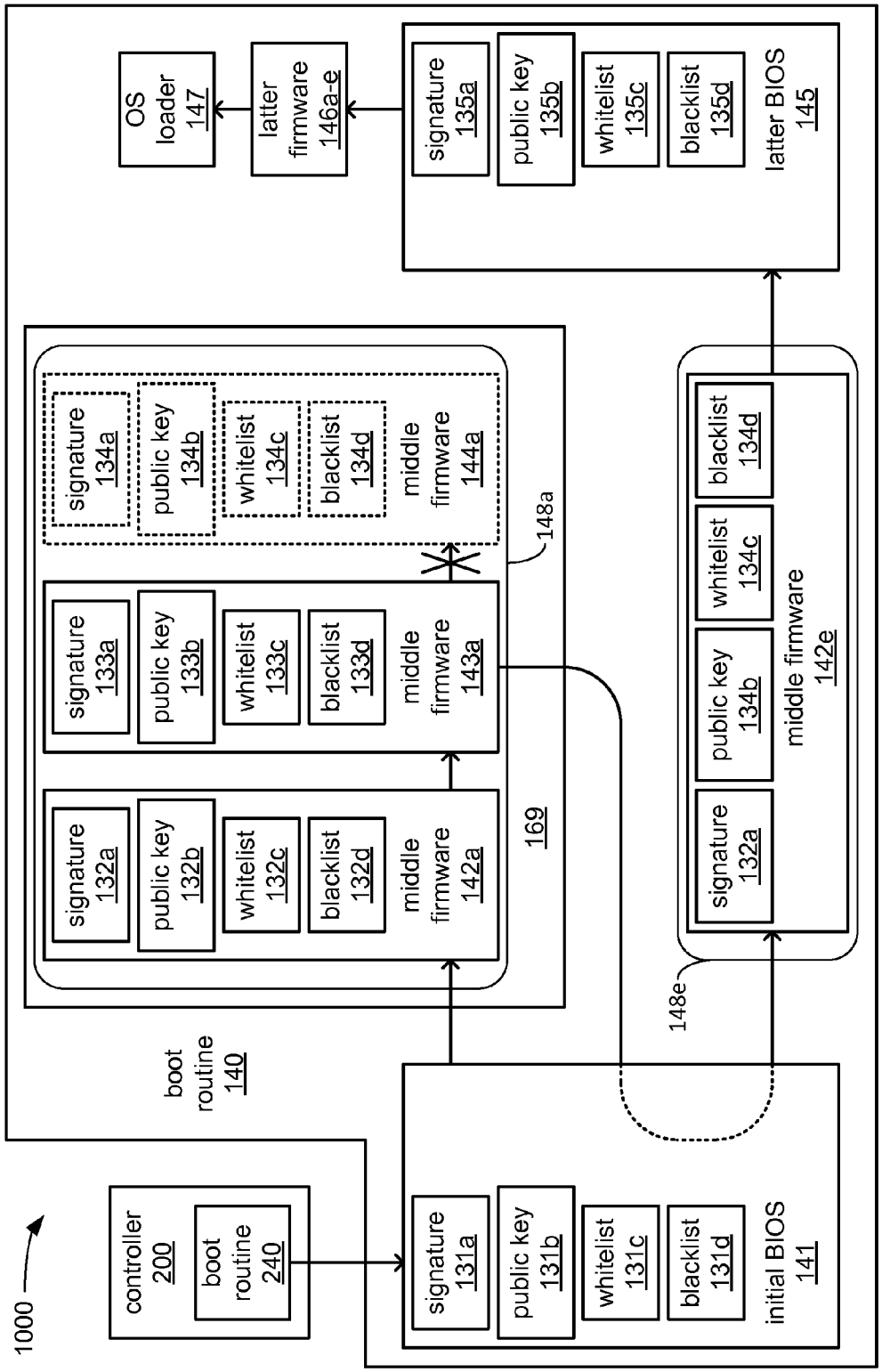
FIG. 6 illustrates a second example using the embodiment of FIG. 1.

FIG. 6 depicts an example of use of features of the computing device 1000 in which a first boot process is aborted and a second boot process is attempted in response to a failure of an attempt to authenticate a middle firmware component in the first boot process. Specifically, as depicted in FIG. 6, the computing device 1000 is initially in the process of booting in a first boot process in which a chain of authentication is being formed through the pathway 148a defined by the middle firmware 142a, 143a and 144a, when the first boot process is halted as a result of the middle firmware 144a failing to be authenticated as the processor circuit 150 is executing instructions of the middle firmware 143a to attempt authentication of the middle firmware 144a.

It may be that the private key used to create the signature 134a of the middle firmware 144a has been revoked and/or the signature 134a itself is no longer accepted. Alternatively, a component malfunction of the storage 160 may have resulted in the middle firmware 144a becoming corrupted (possibly resulting in the signature 134a or the whole of the middle firmware 144a becoming unreadable). In still another alternative, the middle firmware 144a may simply be missing, a possibility that may occur, for example, if the middle firmware 142a, 143a and 144a were meant to be provided together to the computing device 1000 through the removable storage medium 169, but the middle firmware 144*a* was somehow mistakenly not included thereon.

Regardless of the exact reason for the attempt to authenticate the middle firmware 144*a* failing, the processor circuit 150 is caused to start over booting the computing device 1000 with a second boot process through the pathway 148*e* defined by the middle firmware 142*e*. As depicted, unlike the first boot process, an unbroken chain of authentication is successfully formed in this second boot process, extending all the way to the OS loader 147 through the pathway 148*e*. As has been discussed, a prioritization of at least the pathways 148*a* and 148*e* relative to each other may have been defined by which the pathway 148*e* is automatically resorted to in the event of a failure arising from use of the pathway 148*a*.

Figure 7:
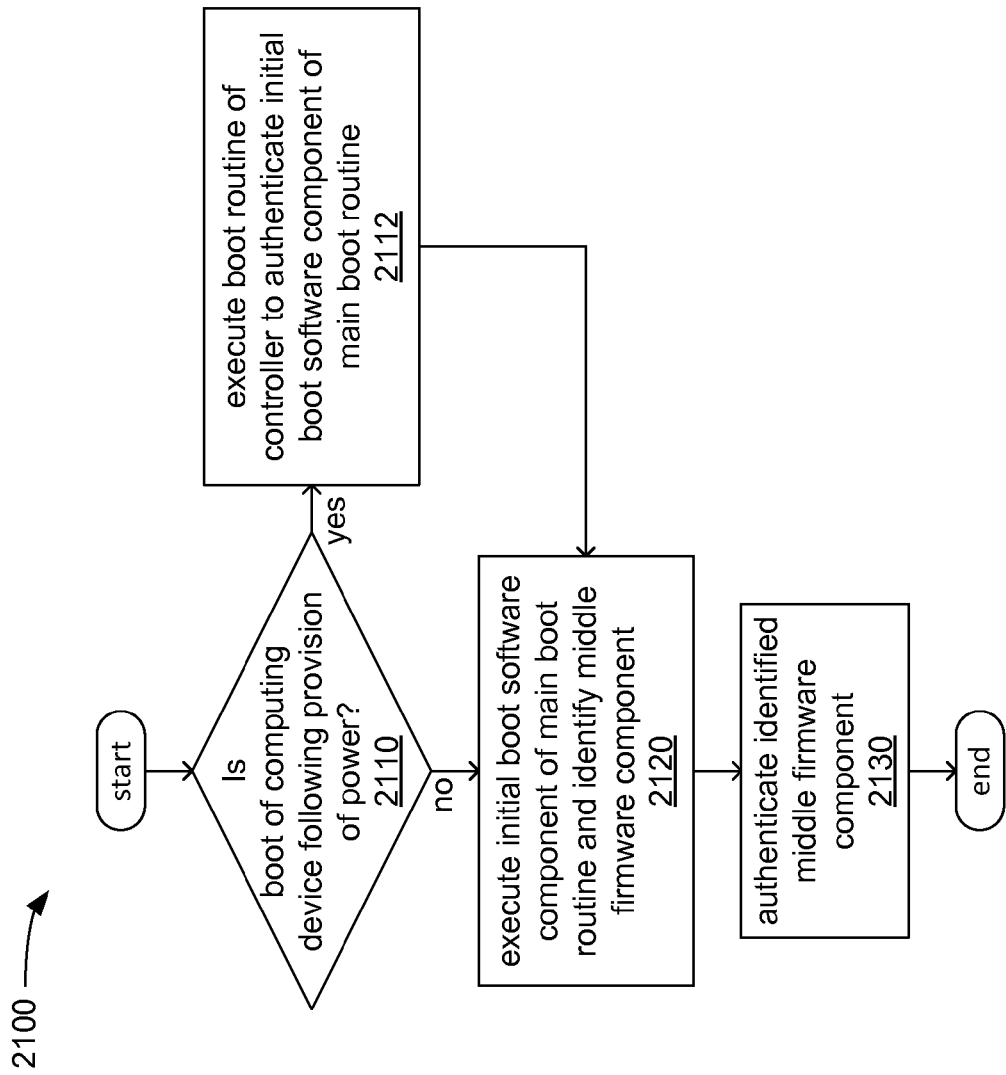
FIG. 7 illustrates an embodiment of a first logic flow.

FIG. 7 illustrates an embodiment of a logic flow 2100. The logic flow 2100 may be representative of some or all of the operations executed by one or more embodiments described herein. More specifically, the logic flow 2100 may illustrate operations performed by the processor circuits 150 and 250 of one of the main operating environment of the computing device 1000 and of the operating environment of the controller 200, respectively, in executing at least the boot routines 140 and 240.

At 2110, a computing device (e.g., the computing device 1000) performs a boot process, and a check is made as to whether or not the boot process is as a result of power being provided to the computing device (e.g., as a result of the computing device being "powered on"). If indeed the boot process is a result of power being so provided, then at 2112, a processor circuit of a controller of the computing device (e.g., the processor circuit 250 of the controller 200) is caused to execute instructions of a boot routine of that controller (e.g., the boot routine 240) to perform various initialization tasks. Further, execution of the boot routine of the controller causes the processor circuit of the controller to authenticate an initial boot software component of the boot software of the main operating environment of the computing device (e.g., the initial BIOS 141 of the boot routine 140, the main boot software). Thus, at 2112, the boot routine of the controller is employed as a trusted starting point for a chain of authentication.

However, if the boot process is not a result of power being applied to the computing device, then at 2120, the main processor circuit of the main operating environment of the computing device (e.g., the processor circuit 150, the main processor circuit) is caused to execute the initial boot software component of the boot software of the main operating environment. In so doing, the main processor circuit is caused to identify a middle firmware component to be authenticated and subsequently executed. As has been discussed, there may be multiple side-by-side sets of middle firmware components, each set defining a pathway of multiple parallel pathways. Thus, identifying which middle firmware component to authenticate (and thereby effectively selecting one of the pathways) may be based on a configuration setting (perhaps provided during execution of a setup routine) that specifies an address pointer to a middle firmware component, may be based on which middle firmware component has been loaded into a specific memory location at a specific address, or may be based on a prioritization of those parallel pathways.

Regardless of the exact manner in which the middle firmware component is identified at 2120 for authentication, that middle firmware component is authenticated at 2130.

Figure 8:
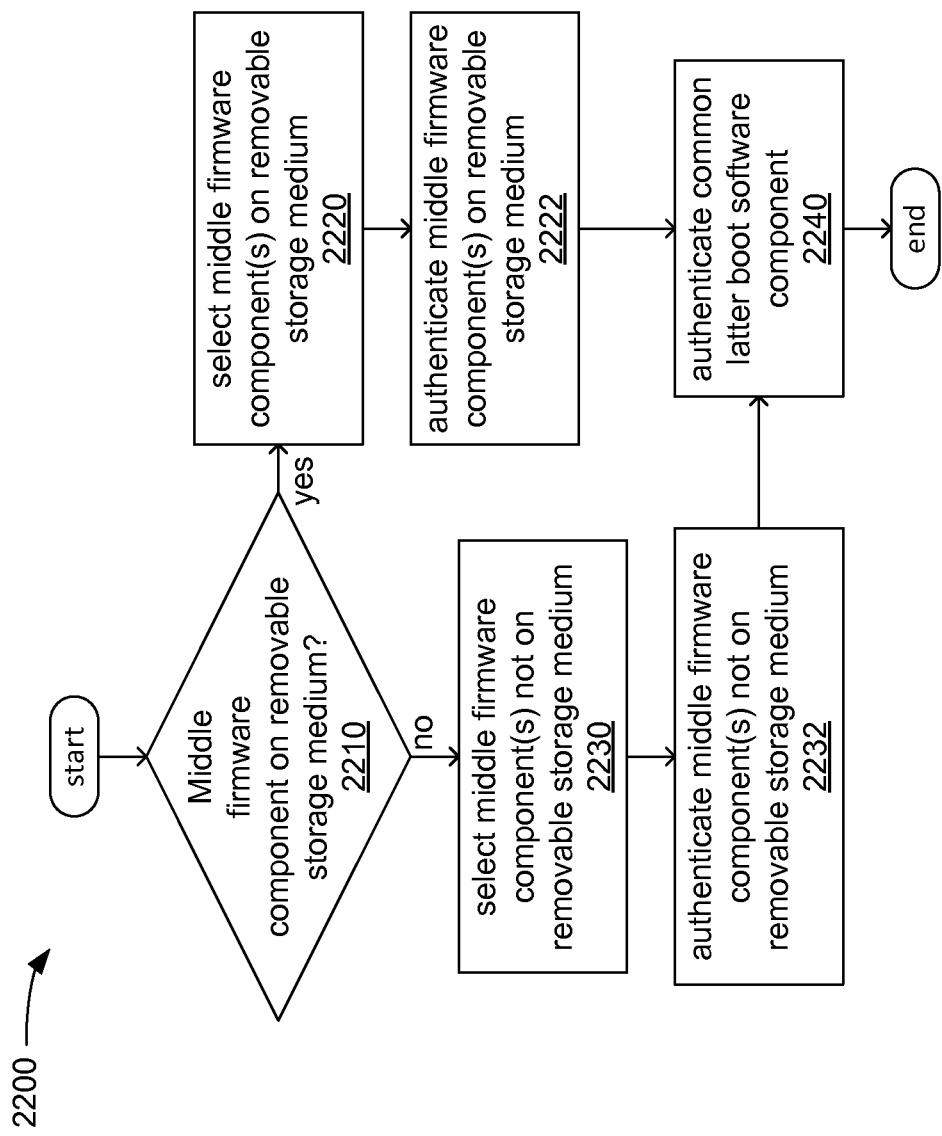
FIG. 8 illustrates an embodiment of a second logic flow.

FIG. 8 illustrates an embodiment of a logic flow 2200. The logic flow 2200 may be representative of some or all of the operations executed by one or more embodiments described herein. More specifically, the logic flow 2200 may illustrate operations performed by at least the processor circuit 150 of the computing device 1000 in executing at least the boot routine 140.

At 2210, a computing device (e.g., the computing device 1000) performs a boot process, and a check is made as to whether or not there are one or more middle firmware components stored in a removable storage medium (e.g., the removable storage medium 169).

If a removable storage medium with one or more middle firmware components stored therein is found, then at 2220, an assumption is made that the removable storage medium with those middle firmware component(s) is intentionally present at that time specifically to cause the boot process to include those firmware component(s), and they are selected to be included in the boot process. Then, at 2222, those middle firmware component(s) are authenticated, one at a time, forming a chain of authentication among boot software components that includes those middle firmware components, as has been discussed above at length.

However, if no removable storage medium storing one or more middle firmware components is found, then at 2230, middle firmware components found elsewhere (e.g., within a non-removable portion of the storage 160) are selected to be included in the boot process by default. Then, at 2232, those middle firmware component(s) are authenticated, one at a time, forming a chain of authentication, as has been discussed above at length.

Regardless of which middle firmware component(s) were selected (either those stored on the removable storage medium, or those that are not), at 2240, a latter boot software component that is the common boot software component at the point of rejoinder of the two pathways defined by these two sets of middle firmware components, is authenticated.

Figure 9:
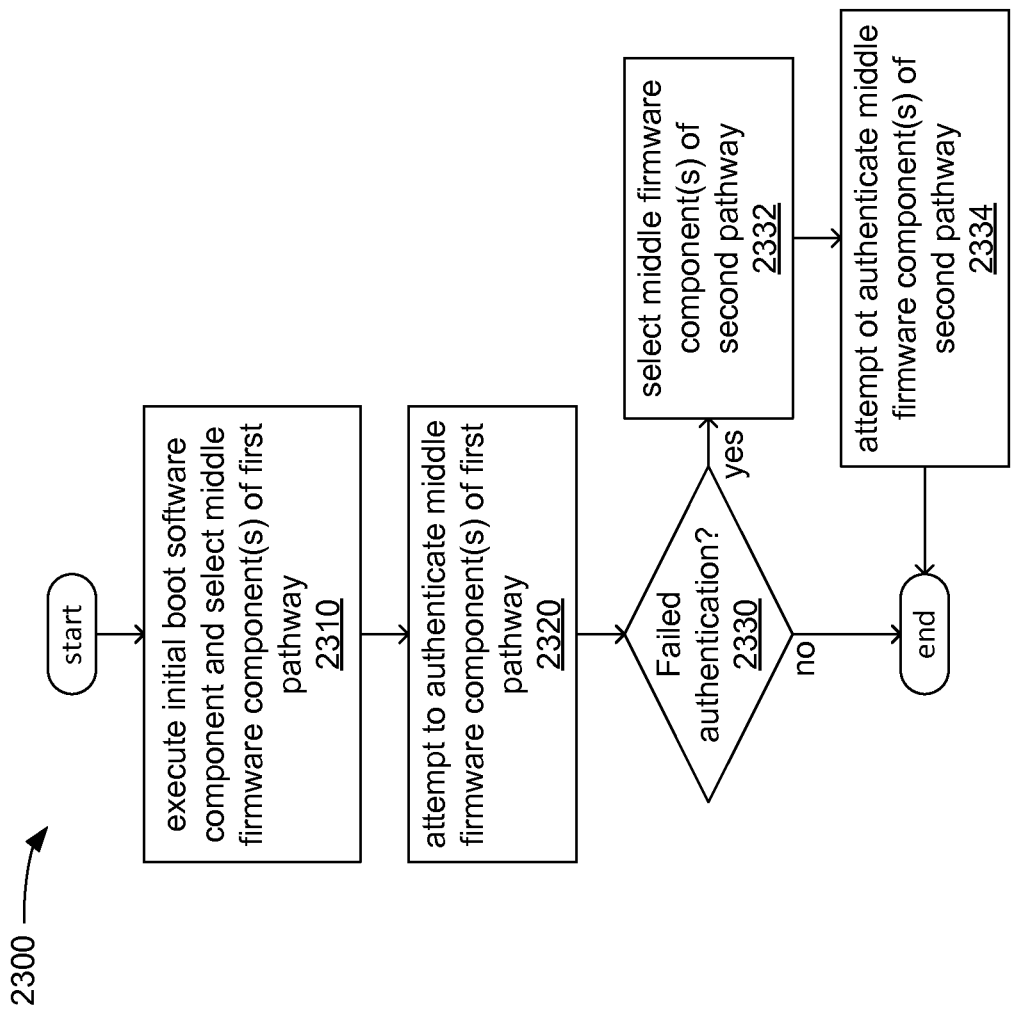
FIG. 9 illustrates an embodiment of a third logic flow.

FIG. 9 illustrates an embodiment of a logic flow 2300. The logic flow 2300 may be representative of some or all of the operations executed by one or more embodiments described herein. More specifically, the logic flow 2300 may illustrate operations performed by at least the processor circuit 150 of the computing device 1000 in executing at least the boot routine 140.

At 2310, a computing device (e.g., the computing device 1000) performs a boot process, and as part of that boot process, an initial boot software component (e.g., the initial BIOS 141) is executed. Also as part of that boot process, one or more middle firmware component(s) that define a first pathway (of multiple parallel pathways of middle firmware components) are selected.

At 2320, authentication of the middle firmware component(s) of the first pathway is attempted, and a check is made of whether the attempt at authentication of all middle firmware component(s) of the first pathway was successful at 2330.

If that attempt was not successful, then at 2332, one or more middle firmware component(s) that define a second pathway (of those multiple parallel pathways) are selected. And, at 2334, authentication of the middle firmware component(s) of the second pathway is attempted.

Figure 10:
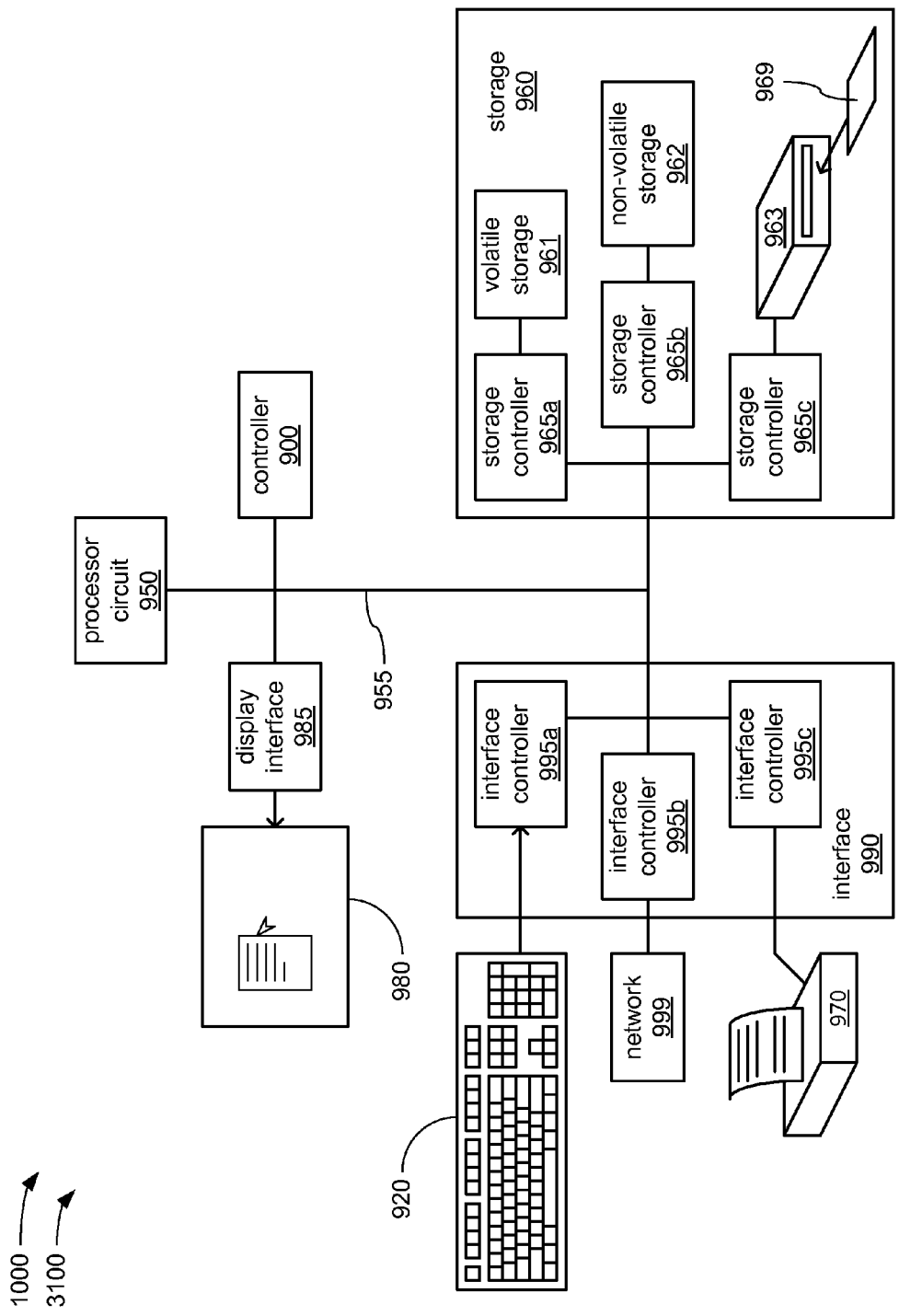
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of one or more of the computing devices 1000 and 400, and/or within the controller 200. It should be noted that components of the processing architecture 3100 are given reference numbers in which the last two digits correspond to the last two digits of reference numbers of components earlier depicted and described as part of each of the computing device 1000 and the controller 200. This is done as an aid to correlating such components of whichever ones of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, a controller 900, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

The controller 900 corresponds to the controller 200. As previously discussed, the controller 200 may implement the processing architecture 3100. Thus, in essence, the controller 200 could be regarded, at least to some extent, as a computing device embedded within the computing device 1000. As such, the controller 200 may perform various functions, including those that have been described at length herein, in support of the computing device 1000 performing various functions.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150 and 250) may comprise any of a wide variety of commercially available processors, employing any of a wide variety of technologies and implemented with one or more cores physically combined in any of a number of ways.

As previously discussed, the storage 960 (corresponding to one or more of the storages 160 and 260) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable removable storage medium 969 (possibly corresponding to the removable storage medium 169), the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable removable storage medium 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage medium such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable removable storage medium 969, and the removable media storage 963 may be subsequently employed in copying that routine to the non-volatile storage 962 for longer term storage not requiring the continuing presence of the machine-readable removable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920 (possibly corresponding to the controls 120). The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 970. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to the display 180), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a processor circuit; and a storage communicatively coupled to the processor circuit and arranged to store an initial boot software component comprising a sequence of instructions. The sequence of instructions is operative on the processor circuit to select a first set of boot software components of multiple sets of boot software components, each set of boot software components defines a pathway that branches from the initial boot software component and that rejoins at a latter boot software component; authenticate a first boot software component of the first set of boot software components; and execute a sequence of instructions of the first boot software component to authenticate a second boot software component of the first set of boot software components to form a chain of authentication through a first pathway defined by the first set of boot software components.

The above example of an apparatus in which the instructions are operative on the processor circuit to select the first set of boot software components based on detection of a removable storage medium accessible to the processor circuit and detection of the first set of boot software components stored in the removable storage medium.

Either of the above examples of an apparatus in which the instructions are operative on the processor circuit to select the first set of boot software components based on detection of a server accessible to the processor circuit via a network and detection of the first set of boot software components stored in a storage of the server.

Any of the above examples of an apparatus in which the instructions are operative on the processor circuit to select the first set of boot software components based on a specified order of priority of the pathways defined by the multiple sets of boot software components.

Any of the above examples of an apparatus in which the instructions are operative on the processor circuit to select a second set of boot software components of the multiple sets of boot software components in response to a failure in authentication of a boot software component of the first set of boot software components; and authenticate a third boot software component of the second set of boot software components.

Any of the above examples of an apparatus in which the initial boot software component comprises a first public key; the first boot software component comprises a first signature and a second public key; the second boot software component comprises a second signature; authenticating the first boot software component comprises verifying the first signature as created by a private key that matches the first public key; and authenticating the second boot software component comprises verifying the second signature as created by a private key that matches the second public key.

Any of the above examples of an apparatus in which the initial boot software component comprises one of a whitelist and a blacklist, and authenticating the first boot software component comprises comparing the first signature to the one of the whitelist and the blacklist.

Any of the above examples of an apparatus in which the instructions are operative on the processor circuit to execute a sequence of instructions of a boot software component of the first set of boot software components to authenticate the latter boot software component to extend the chain of authentication from the initial boot software component to the latter boot software component.

Any of the above examples of an apparatus in which the instructions are operative on the processor circuit to execute a sequence of instructions of the latter boot software component to select the first set of boot software components based on reception of signals indicating operation of controls to select the first set of boot software.

An example of another apparatus comprises a main processor circuit; a main storage communicatively coupled to the main processor circuit and arranged to store an initial boot software component; a controller comprising a controller processor circuit communicatively coupled to the main storage, and a controller storage communicatively coupled to the controller processor circuit and arranged to store a boot routine comprising a sequence of instructions operative on the controller processor circuit to authenticate the initial boot software component. Also, the initial boot software component is operative on the main processor circuit to select a first set of boot software components of multiple sets of boot software components, each set of boot software components defines a pathway that branches from the initial boot software component and that rejoins at a latter boot software component, and the main storage stores at least one set of boot software components; and authenticate a first boot software component of the first set of boot software components to form a chain of authentication that extends from the boot routine and into a first pathway defined by the first set of boot software components.

The above example of another apparatus in which the initial boot software component is operative on the main processor circuit to select the first set of boot software components based on detection of a removable storage medium accessible to the main processor circuit and detection of the first set of boot software components stored in the removable storage medium.

Either of the above examples of another apparatus in which the initial boot software component is operative on the main processor circuit to select the first set of boot software components based on detection of a server accessible to the main processor circuit via a network and detection of the first set of boot software components stored in a storage of the server.

Any of the above examples of another apparatus in which the initial boot software component is operative on the main processor circuit to select the first set of boot software components based on a specified order of priority of the pathways defined by the multiple sets of boot software components.

Any of the above examples of another apparatus in which the initial boot software component is operative on the main processor circuit to select a second set of boot software components of the multiple sets of boot software components in response to a failure in authentication of a boot software component of the first set of boot software components; and authenticate a third boot software component of the second set of boot software components.

Any of the above examples of another apparatus in which the initial boot software component is operative on the main processor circuit to execute a sequence of instructions of the first boot software component to authenticate a second boot software component of the first set of boot software components to extend the chain of authentication from the initial boot software component through the first pathway.

Any of the above examples of another apparatus in which the initial boot software component comprises a first public key; the first boot software component comprises a first signature and a second public key; the second boot software component comprises a second signature; authenticating the first boot software component comprises verifying the first signature as created by a private key that matches the first public key; and authenticating the second boot software component comprises verifying the second signature as created by a private key that matches the second public key.

Any of the above examples of another apparatus in which the initial boot software component comprises one of a whitelist and a blacklist, and authenticating the first boot software component comprises comparing the first signature to the one of the whitelist and the blacklist.

An example of a computer-implemented method comprises executing a sequence of instructions of a boot routine on a first processor circuit to employ a first public key of the boot routine to authenticate an initial boot software component; executing a sequence of instructions of the initial boot software component on a second processor circuit to select a first set of boot software components of multiple sets of boot software components, each set of boot software components defining a pathway branching from the initial boot software component and rejoining at a latter boot software component; and executing a sequence of instructions of the initial boot software component on the second processor circuit to employ a second public key of the initial boot software component to authenticate a first boot software component of the first set of boot software components, forming a chain of authentication from the boot routine and into a first pathway defined by the first set of boot software components.

The above example of a computer-implemented method in which the initial boot software component comprises one of a whitelist and a blacklist, and executing a sequence of instructions of the initial boot software component on the second processor circuit to authenticate the first boot software component of the first set of boot software components comprises comparing a signature of the first boot software component to the one of the whitelist and the blacklist.

Either of the above examples of a computer-implemented method comprises selecting the first set of boot software components based on detecting a removable storage medium coupled to a computing device and detecting the first set of boot software components stored in the removable storage medium.

Any of the above examples of a computer-implemented method comprises selecting the first set of boot software components based on a specified order of priority of the pathways defined by the multiple sets of boot software components.

Any of the above examples of a computer-implemented method comprises selecting a second set of boot software components of the multiple sets of boot software components in response to a failure in authenticating a boot software component of the first set of boot software components; and authenticating a third boot software component of the second set of boot software components.

An example of at least one machine-readable storage medium comprises instructions that when executed by a computing device, cause the computing device to select a first set of boot software components of multiple sets of boot software components, each set of boot software components defining a pathway branching from an initial boot software component and rejoining at a latter boot software component; employ a first public key of the initial boot software component to authenticate a first boot software component of the first set of boot software components; and employ a second public key of the first boot software component to authenticate a second boot software component of the first set of boot software components, forming a chain of authentication from the initial boot software component through a first pathway defined by the first set of boot software components.

The above example of at least one machine-readable storage medium in which the initial boot software component comprises one of a whitelist and a blacklist, and authenticating the first boot software component of the first set of boot software components comprises comparing a signature of the first boot software component to the one of the whitelist and the blacklist.

Either of the above examples of at least one machine-readable storage medium in which the computing device is caused to select the first set of boot software components based on detecting a removable storage medium coupled to the computing device and detecting the first set of boot software components stored in the removable storage medium.

Any of the above examples of at least one machine-readable storage medium in which the computing device is caused to select the first set of boot software components based on a specified order of priority of the pathways defined by the multiple sets of boot software components.

Any of the above examples of at least one machine-readable storage medium in which the computing device is caused to select a second set of boot software components of the multiple sets of boot software components in response to a failure in authenticating a boot software component of the first set of boot software components; and authenticate a third boot software component of the second set of boot software components.

The invention claimed is:
1. An apparatus comprising:
a processor circuit; and
a storage device communicatively coupled to the processor circuit and that stores an initial boot software component comprising a sequence of instructions operative on the processor circuit to:
select a first set of boot software components of multiple sets of boot software components, each set of boot software components defines a pathway that branches from the initial boot software component and that rejoins at a latter boot software component;
authenticate a first boot software component of the first set of boot software components; and
execute a sequence of instructions of the first boot software component to authenticate a second boot software component of the first set of boot software components to form a chain of authentication through a first pathway defined by the first set of boot software components.

2. The apparatus of claim 1, the instructions operative on the processor circuit to select the first set of boot software components based on detection of a removable storage medium accessible to the processor circuit and detection of the first set of boot software components stored in the removable storage medium.

3. The apparatus of claim 1, the instructions operative on the processor circuit to select the first set of boot software components based on detection of a server accessible to the processor circuit via a network and detection of the first set of boot software components stored in a storage of the server.

4. The apparatus of claim 1, the instructions operative on the processor circuit to select the first set of boot software components based on a specified order of priority of the pathways defined by the multiple sets of boot software components.

5. The apparatus of claim 4, the instructions operative on the processor circuit to:
select a second set of boot software components of the multiple sets of boot software components in response to a failure in authentication of a boot software component of the first set of boot software components; and
authenticate a third boot software component of the second set of boot software components.

6. The apparatus of claim 1:
the initial boot software component comprising a first public key;
the first boot software component comprising a first signature and a second public key;
the second boot software component comprising a second signature;
authenticating the first boot software component comprises verifying the first signature as created by a private key that matches the first public key; and
authenticating the second boot software component comprises verifying the second signature as created by a private key that matches the second public key.

7. The apparatus of claim 6, the initial boot software component comprising one of a whitelist and a blacklist, and authenticating the first boot software component comprises comparing the first signature to the one of the whitelist and the blacklist.

8. The apparatus of claim 1, the instructions operative on the processor circuit to execute a sequence of instructions of a boot software component of the first set of boot software components to authenticate the latter boot software component to extend the chain of authentication from the initial boot software component to the latter boot software component.

9. The apparatus of claim 8, the instructions operative on the processor circuit to execute a sequence of instructions of the latter boot software component to select the first set of boot software components based on reception of signals indicating operation of controls to select the first set of boot software.

10. An apparatus comprising:
a main processor circuit;
a main storage device communicatively coupled to the main processor circuit and that stores an initial boot software component;
a controller comprising a controller processor circuit communicatively coupled to the main storage device, and a controller storage device communicatively coupled to the controller processor circuit and that stores a boot routine comprising a sequence of instructions operative on the controller processor circuit to authenticate the initial boot software component; and
the initial boot software component operative on the main processor circuit to:
select a first set of boot software components of multiple sets of boot software components, each set of boot software components defines a pathway that branches from the initial boot software component and that rejoins at a latter boot software component, and the main storage device stores at least one set of boot software components; and
authenticate a first boot software component of the first set of boot software components to form a chain of authentication that extends from the boot routine and into a first pathway defined by the first set of boot software components.

11. The apparatus of claim 10, the initial boot software component operative on the main processor circuit to select the first set of boot software components based on detection of a removable storage medium accessible to the main processor circuit and detection of the first set of boot software components stored in the removable storage medium.

12. The apparatus of claim 10, the initial boot software component operative on the main processor circuit to select the first set of boot software components based on detection of a server accessible to the main processor circuit via a network and detection of the first set of boot software components stored in a storage of the server.

13. The apparatus of claim 10, the initial boot software component operative on the main processor circuit to select the first set of boot software components based on a specified order of priority of the pathways defined by the multiple sets of boot software components.

14. The apparatus of claim 13, the initial boot software component operative on the main processor circuit to:
select a second set of boot software components of the multiple sets of boot software components in response to a failure in authentication of a boot software component of the first set of boot software components; and
authenticate a third boot software component of the second set of boot software components.

15. The apparatus of claim 10, the initial boot software component operative on the main processor circuit to execute a sequence of instructions of the first boot software component to authenticate a second boot software component of the first set of boot software components to extend the chain of authentication from the initial boot software component through the first pathway.

16. The apparatus of claim 15:
the initial boot software component comprising a first public key;
the first boot software component comprising a first signature and a second public key;
the second boot software component comprising a second signature;

authenticating the first boot software component comprises verifying the first signature as created by a private key that matches the first public key; and authenticating the second boot software component comprises verifying the second signature as created by a private key that matches the second public key.

17. The apparatus of claim 16, the initial boot software component comprising one of a whitelist and a blacklist, and authenticating the first boot software component comprises comparing the first signature to the one of the whitelist and the blacklist.

18. A computer-implemented method comprising:
    executing a sequence of instructions of a boot routine on a first processor circuit to employ a first public key of the boot routine to authenticate an initial boot software component;
    executing a sequence of instructions of the initial boot software component on a second processor circuit to select a first set of boot software components of multiple sets of boot software components, each set of boot software components defining a pathway branching from the initial boot software component and rejoining at a latter boot software component; and
    executing a sequence of instructions of the initial boot software component on the second processor circuit to employ a second public key of the initial boot software component to authenticate a first boot software component of the first set of boot software components, forming a chain of authentication from the boot routine and into a first pathway defined by the first set of boot software components.

19. The computer-implemented method of claim 18, the initial boot software component comprising one of a whitelist and a blacklist, and executing a sequence of instructions of the initial boot software component on the second processor circuit to authenticate the first boot software component of the first set of boot software components comprises comparing a signature of the first boot software component to the one of the whitelist and the blacklist.

20. The computer-implemented method of claim 18, comprising selecting the first set of boot software components based on detecting a removable storage medium coupled to a computing device and detecting the first set of boot software components stored in the removable storage medium.

21. The computer-implemented method of claim 18, comprising selecting the first set of boot software components based on a specified order of priority of the pathways defined by the multiple sets of boot software components.

22. The computer-implemented method of claim 18, comprising:
    selecting a second set of boot software components of the multiple sets of boot software components in response to a failure in authenticating a boot software component of the first set of boot software components; and
    authenticating a third boot software component of the second set of boot software components.

23. At least one non-transitory machine-readable storage medium comprising instructions that when executed by a computing device, cause the computing device to:
    select a first set of boot software components of multiple sets of boot software components, each set of boot software components defining a pathway branching from an initial boot software component and rejoining at a latter boot software component;
    employ a first public key of the initial boot software component to authenticate a first boot software component of the first set of boot software components; and
    employ a second public key of the first boot software component to authenticate a second boot software component of the first set of boot software components, forming a chain of authentication from the initial boot software component through a first pathway defined by the first set of boot software components.

24. The at least one non-transitory machine-readable storage medium of claim 23, the initial boot software component comprising one of a whitelist and a blacklist, and authenticating the first boot software component of the first set of boot software components comprises comparing a signature of the first boot software component to the one of the whitelist and the blacklist.

25. The at least one non-transitory machine-readable storage medium of claim 23, the computing device caused to select the first set of boot software components based on detecting a removable storage medium coupled to the computing device and detecting the first set of boot software components stored in the removable storage medium.

26. The at least one non-transitory machine-readable storage medium of claim 23, the computing device caused to select the first set of boot software components based on a specified order of priority of the pathways defined by the multiple sets of boot software components.

27. The at least one non-transitory machine-readable storage medium of claim 23, the computing device caused to:
    select a second set of boot software components of the multiple sets of boot software components in response to a failure in authenticating a boot software component of the first set of boot software components; and
    authenticate a third boot software component of the second set of boot software components.

* * * * *